(12) United States Patent
Yonemura

(10) Patent No.: US 8,692,961 B2
(45) Date of Patent: Apr. 8, 2014

(54) LIQUID CRYSTAL DISPLAY DEVICE

(75) Inventor: Koji Yonemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 380 days.

(21) Appl. No.: 12/772,428

(22) Filed: May 3, 2010

(65) Prior Publication Data

US 2010/0296042 A1 Nov. 25, 2010

(30) Foreign Application Priority Data

May 20, 2009 (JP) ................................ 2009-121667

(51) Int. Cl.
*G02F 1/1333* (2006.01)
*G02F 1/1343* (2006.01)
*G02F 1/1335* (2006.01)

(52) U.S. Cl.
USPC .......................... 349/110; 349/106; 349/141

(58) Field of Classification Search
None
See application file for complete search history.

(56) References Cited

U.S. PATENT DOCUMENTS

| | | | |
|---|---|---|---|
| 6,459,465 B1 * | 10/2002 | Lee | 349/141 |
| 2002/0027538 A1 * | 3/2002 | Shimizu et al. | 345/87 |
| 2002/0041354 A1 | 4/2002 | Noh et al. | |
| 2006/0262252 A1 | 11/2006 | Yonemura et al. | |
| 2007/0279572 A1 | 12/2007 | Yonemura et al. | |
| 2008/0186440 A1 * | 8/2008 | Lim et al. | 349/141 |
| 2009/0310072 A1 | 12/2009 | Morii et al. | |
| 2009/0322975 A1 * | 12/2009 | Song et al. | 349/46 |
| 2009/0322995 A1 | 12/2009 | Yonemura et al. | |

FOREIGN PATENT DOCUMENTS

| | | |
|---|---|---|
| JP | 2002-182230 | 6/2002 |
| JP | 2008-32897 A | 2/2008 |
| JP | 2008-209686 A | 9/2008 |

OTHER PUBLICATIONS

U.S. Appl. No. 13/251,613, filed Oct. 3, 2011, Yonemura.
U.S. Appl. No. 13/489,837, filed Jun. 6, 2012. Yonemura, et al.
Japanese Office Action Issued Feb. 12, 2013 in Patent Application No. 2009-121667 (with partial English translation).

* cited by examiner

*Primary Examiner* — Michael Caley
(74) *Attorney, Agent, or Firm* — Oblon, Spivak, McClelland, Maier & Neustadt, L.L.P.

(57) ABSTRACT

A liquid crystal device according to an embodiment of the present invention includes: a first substrate including a slit electrode that has slit-like apertures to form line-like patterns substantially in a same direction as either source wires or gate wires; a second substrate including a light shielding film that extends in a same direction as the line-like patterns of the slit electrode, and that has an overlap area with either the source wires or the gate wires, and that is arranged that color filter films are partitioned to prevent color mixture when displayed in a single color. A non-opposed area to the light shielding film is formed at an end of the slit electrode in a width direction that a transmittance may not be reduced due to the light shielding film in the areas where the light shielding film and the slit electrode are arranged in an overlapped manner.

13 Claims, 13 Drawing Sheets

LIQUID CRYSTAL DISPLAY DEVICE

INCORPORATION BY REFERENCE

This application is based upon and claims the benefit of priority from Japanese patent application No. 2009-121667, filed on May 20, 2009, the disclosure of which is incorporated herein in its entirety by reference.

BACKGROUND OF THE INVENTION

1. Field of the Invention

The present invention relates to a liquid crystal display device and, more particularly, to a liquid crystal display device in the FFS (Fringe Field Switching) mode.

2. Description of Related Art

A liquid crystal display device is one of flat panels, and it is widely used in monitors of personal computers and portable information terminal devices, etc., by taking advantage of its low power consumption, compactness, and lightweight. In addition, the liquid crystal display device is also widely used for TV sets, and it is replacing conventional cathode-ray tubes.

A mainstream of the liquid crystal display device in recent years is an active matrix type in which a plurality of display signal wires and a plurality of scanning signal wires are arranged in a lattice, and in which a thin film transistor (hereinafter also referred to as "TFT" (Thin Film Transistor)) is formed as a switching element in a pixel area surrounded with the display signal wires and the scanning signal wires. A structure and a material of the TFT are arbitrarily selected according to an application and a required performance of the display device. As for a structure of the TFT, an MOS (Metal Oxide Semiconductor) structure, such as a bottom gate type (reverse stagger type) and a top gate type (stagger type), is often employed. There are included an amorphous silicon film, a polycrystalline silicon (polysilicon) film, etc as a semiconductor film that constitutes the TFT.

A TFT using the polycrystalline silicon film as a channel active layer has high electron mobility. A performance of the active matrix type display device has been rapidly improved by utilizing the polycrystalline silicon film. The TFT using the polycrystalline silicon film is used for forming a circuit around the display device, whereby use of an IC and an IC-mounted substrate can be reduced. This allows to simplify a configuration of the display device to thereby achieve reduction in size thereof, and also allows to enhance reliability thereof.

Meanwhile, development of the multimedia industry in recent years has strongly required a high-definition image display device. A conventional liquid crystal driving system, TN (Twisted Nematic) mode, is a system that changes a display state by applying a vertical electric field perpendicular to a substrate, raising or laying liquid crystal molecules with respect to a substrate surface according to a condition of applying a voltage, and it has a poor viewing angle characteristic due to a principle thereof. An IPS (In-Plane Switching) mode is a system that moves the liquid crystal molecules within a surface parallel to the substrate to thereby change the display state ON or OFF by applying a horizontal electric field parallel to the substrate. The system is then widely accepted in the market since a change of retardation, which is a phase difference of a liquid crystal layer due to viewing angles, is small, and the viewing angle characteristic is wide.

In recent years, the FFS mode has been developed by further improving the IPS mode (for example, refer to Japanese Unexamined Patent Application Publication No. 2002-182230). The FFS mode is also a system that moves the liquid crystal molecules by mainly applying the horizontal electric field parallel to the substrate, and it is superior in the viewing angle characteristic. A difference between the FFS mode and the IPS mode is the following. Namely, in the IPS mode, a distance between a pixel electrode and a common electrode for driving liquid crystals is larger than a cell gap or an electrode width, while in the FFS mode, the distance between the pixel electrode and the common electrode is smaller than the cell gap or the electrode width. In addition, another difference between the two modes is the following. In the IPS mode, the pixel electrode and the common electrode are arranged not to overlap with each other as viewed from a plane, while in the FFS mode, a plate-shaped electrode and a slit electrode are arranged so as to overlap with each other through an insulator layer above the plate-shaped electrode that constitutes the pixel electrode or the common electrode, the slit electrode constituting either of the pixel electrode or the common electrode (the common electrode when the plate-shaped electrode is the pixel electrode, and the pixel electrode when the plate-shaped electrode is the common electrode).

We have now discovered that in the IPS mode, the liquid crystal molecules located between the pixel electrode and the common electrode are driven as viewed from a plane, while the liquid crystal molecules located above the respective electrodes are hardly driven. For this reason, upper portions of the respective electrodes cannot serve to display, which prevents an aperture ratio from becoming high. Meanwhile, in the case of the FFS mode, not only the liquid crystal molecules located between the pixel electrode and the common electrode but also the ones located above the respective electrodes can be driven. For this reason, if each electrode is formed of a transparent conductive film, such as ITO (Indium Tin Oxide), upper portions of the electrodes can also serve to display. Hence, in a liquid crystal display panel with a similar pixel size, the FFS mode can achieve a higher aperture ratio than the IPS mode.

SUMMARY OF THE INVENTION

However, also in the FFS mode, further advancement in a display quality has been strongly required, and further improvement has been desired.

The present invention is made in view of the above-described background, and an exemplary object of the invention is to provide a liquid crystal display device in the FFS mode that can achieve a high display quality.

A liquid crystal device according to an exemplary aspect of the present invention includes a first substrate, a second substrate arranged opposite to the first substrate, and a liquid crystal layer sealed between the first substrate and the second substrate. The first substrate includes: a plurality of gate wires; a plurality of source wires that intersect the plurality of gate wires; a slit electrode that has a plurality of slit-like apertures so as to form a plurality of line-like patterns substantially in a same direction as either the source wires or the gate wires; and a plate-shaped electrode that has an overlap area with the slit electrode as viewed from a plane through an insulating layer, the plate-shaped electrode being on a lower layer than the slit electrode. The second substrate includes: a plurality of color filter films; and a light shielding film that extends substantially in a same direction as the line-like patterns of the slit electrode, and that has an overlap area with either the source wires or the gate wires as viewed from a plane, and that is arranged so that the plurality of color filter films are partitioned to prevent color mixture when displayed in a single color. Either the plate-shaped electrode or the slit electrode is defined as a pixel electrode arranged so as to be connected to the plurality of source wires through a switching element, and the other electrode is defined as a common electrode. A non-opposed area to the light shielding film is formed at an end of the slit electrode in a width direction so that a transmittance may not be reduced due to the light shielding film in the areas where the light shielding film and the slit electrode are arranged in an overlapped manner as viewed from a plane.

The present invention has a superior advantage that can provide a liquid crystal display device in the FFS mode that can achieve a high display quality.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, one example of embodiments to which the present invention is applied will be explained. Note that it goes without saying that other embodiments can fall within the scope of the present invention as long as they meet the subject matter of the present invention. In addition, sizes and ratios of each member in drawings described hereinafter are for convenience, and they are different from real ones.

[First Exemplary Embodiment]

A liquid crystal display device in accordance with a first exemplary embodiment is a liquid crystal display device in the FFS mode provided with an active matrix type TFT array substrate that has a thin film transistor (TFT) of a top gate type MOS structure as a switching element. Here, a transmission type liquid crystal display device will be explained.

Figure 1:
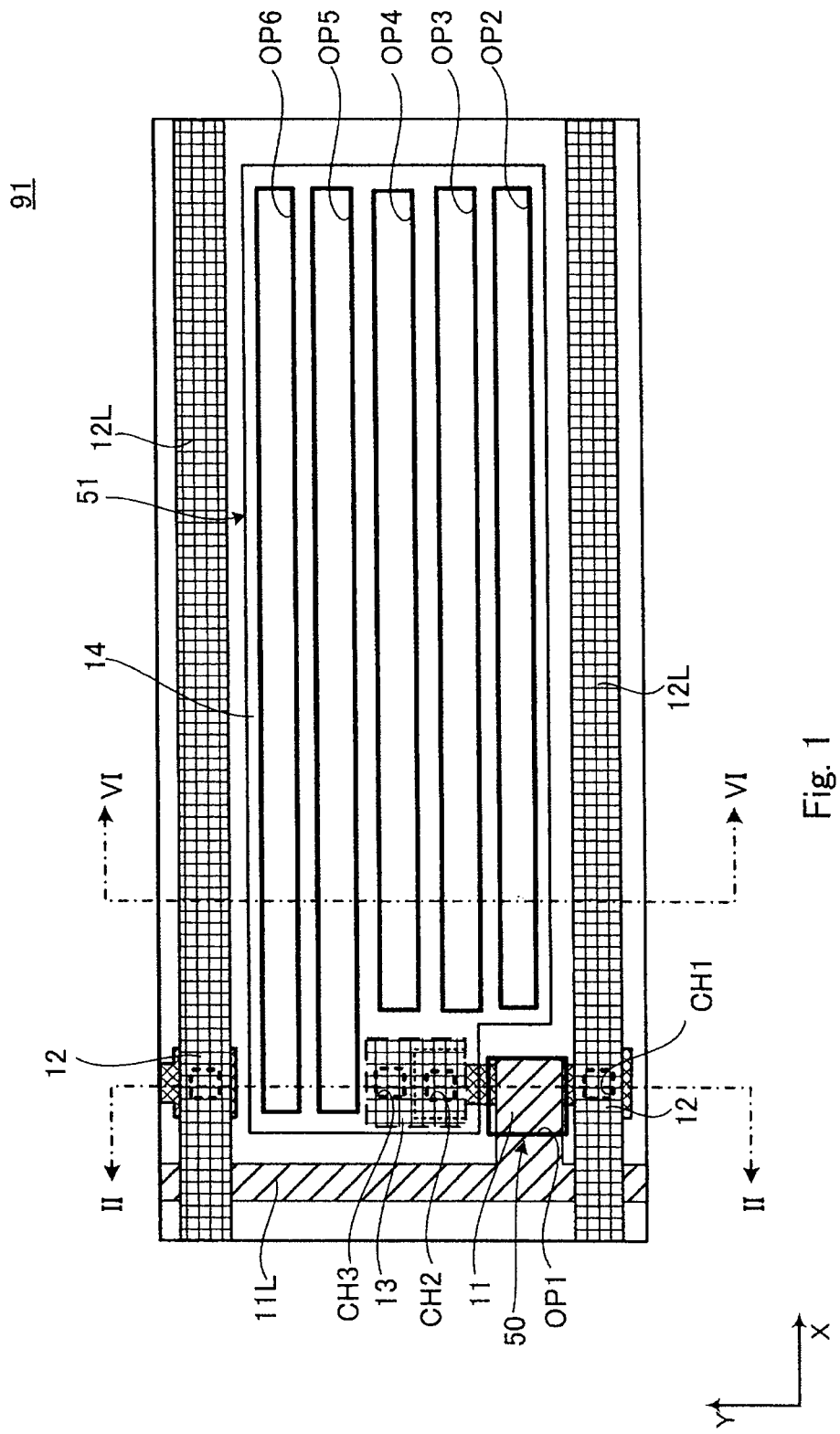
FIG. 1 is a schematic enlarged partial plan view showing a configuration of a TFT array substrate in accordance with a first exemplary embodiment of the present invention.
Figure 2:
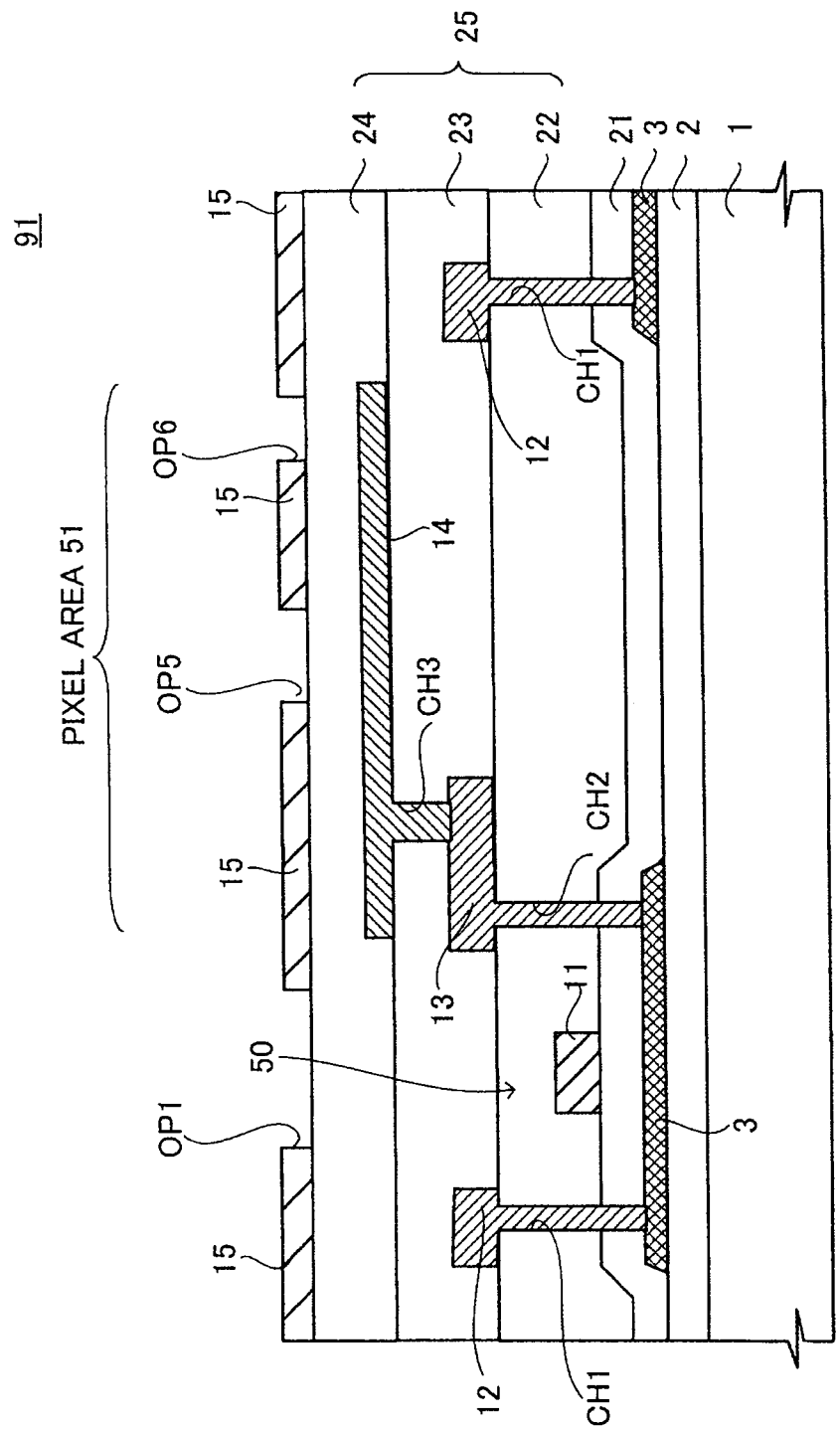
FIG. 2 is a sectional view taken from a line II-II of FIG. 1.

FIG. 1 is a schematic plan view showing an enlarged partial TFT array substrate that works as a first substrate mounted in the liquid crystal display device in accordance with the first exemplary embodiment, and FIG. 2 is a sectional view taken from a line II-II of FIG. 1. It is to be noted that for the purpose of explanation, in FIG. 1, a gate insulating film, an insulating layer (a first interlayer insulating film, a second interlayer insulating film, and a third interlayer insulating film), slit electrodes, etc are omitted. Meanwhile, positions of pattern apertures are shown in FIG. 1 in terms of clarifying the apertures of the slit electrodes. Hence, the slit electrodes are formed in areas other than apertures OP1 to OP6 in FIG. 1.

A TFT array substrate 91 in accordance with the first exemplary embodiment is, as shown in FIGS. 1 and 2, provided with an insulating substrate 1, a base film 2, a semiconductor layer 3, a gate electrode 11, a gate wire (scanning signal wires) 11L, source electrodes 12, source wires (display signal wires) 12L, a drain electrode 13, a plate-shaped electrode 14 that works as a pixel electrode, slit electrodes 15 that work as common electrodes, a gate insulating film 21, a first interlayer insulating film 22 that works as an insulating layer, a second interlayer insulating film 23, a third interlayer insulating film 24, contact holes CH1, CH2, and CH3, etc. It is to be noted that the first interlayer insulating film 22 to the third interlayer insulating film 24 are collectively called an insulating layer 25. It is to be noted that the slit electrodes 15 are, as will be hereinbelow described, grouped into slit electrodes 15A, 15B, and 15C according to positions at which they are formed, but when the positions need not particularly be mentioned, they are just collectively called the slit electrodes 15.

The insulating substrate 1 can be composed of a transparent substrate, such as a glass substrate and a quartz substrate. The base film 2 is formed on one principal surface of the insulating substrate 1. As the base film 2, for example, a laminated structure of a silicon nitride film (SiN film) or a silicon oxidation film ($SiO_2$ film), which is a transparent insulating film, can be used. The base film 2 is not limited to have a two-layer structure, but may have a single layer structure or a multilayer structure with three or more layers.

The semiconductor layer 3 is formed in an island shape on the base film 2 (refer to FIG. 1). A crystalline semiconductor layer, such as a polycrystalline semiconductor layer and a microcrystalline semiconductor layer, and an amorphous semiconductor layer can be applied to the semiconductor layer 3. In the first exemplary embodiment, the polycrystalline silicon (polysilicon) film is applied to the semiconductor layer 3. The polycrystalline silicon film can be obtained by forming an amorphous silicon film and then irradiating this with a laser light.

The gate insulating film 21 is formed so as to cover the semiconductor layer 3 and the base film 2. The gate insulating film 21 may have a single layer structure, or may have a laminated structure composed of a plurality of layers. In order to enhance covering ability of the gate insulating film 21, ends of the semiconductor layer 3 are preferably formed in a tapered shape as shown in FIG. 2. This allows to sufficiently suppress failures such as a breakdown, and to improve reliability of a TFT 50.

The gate electrode 11 is formed on the gate insulating film 21 so as to be arranged opposite to a portion of the semiconductor layer 3. The gate electrode 11 is formed so as to be arranged opposite to a channel area of the semiconductor layer 3 through the gate insulating film 21. On the same layer as the gate electrode 11, the gate wire 11L is formed integrally with the gate electrode 11 using the same material as each other. The gate wire 11L extends in a Y direction shown in FIG. 1, and additionally, a plurality of the wires are disposed parallel to each other in an X direction shown in FIG. 1. The gate electrode 11 occupies an area extending from the gate wire 11L to an upper portion of the semiconductor layer 3, and is configured so that a gate signal may be input into the gate electrode 11 through the gate wire 11L.

The first interlayer insulating film 22 is formed so as to cover the gate electrode 11 and the gate insulating film 21. On the gate insulating film 21 and the first interlayer insulating film 22, formed are contact holes CH1 and CH2 penetrating from a surface of the first interlayer insulating film 22 to a surface of the semiconductor layer 3.

The source electrodes 12 and the drain electrode 13 are formed on the first interlayer insulating film 22. The source electrodes 12 are formed on the first interlayer insulating film 22, and are electrically connected to the semiconductor layer 3 through these contact holes CH1. Similarly, the drain electrode 13 is formed on the first interlayer insulating film 22, and is electrically connected to the semiconductor layer 3 through the contact hole CH2. According to the above configuration, the TFT 50 is formed.

On the same layer as the source electrodes 12 and the drain electrode 13, the source wires 12L are formed integrally with the source electrodes 12 using the same material as each other. In other words, in the source wires 12L, areas electrically connected to the semiconductor layer 3 work as the source electrodes 12. The source wires 12L extend in the X direction shown in FIG. 1, and a plurality of the wires are disposed parallel to each other in the Y direction shown in FIG. 1. Namely, the source wires 12L are disposed in a direction perpendicular to the gate wire 11L through the first interlayer insulating film 22.

The second interlayer insulating film 23 is formed on the source electrodes 12 and the drain electrode 13 to cover them. The plate-shaped electrode 14 composed of a transparent conductive film is formed on the second interlayer insulating film 23. The plate-shaped electrode 14 is electrically connected to the drain electrode 13 through the contact hole CH3 formed on the second interlayer insulating film 23, and it works as a pixel electrode as mentioned above.

The third interlayer insulating film 24 is formed on the plate-shaped electrode 14 to cover it. Materials of the second interlayer insulating film 23 and the third interlayer insulating film 24 are not particularly limited, and for example, a silicon nitride film, an organic resin film composed of an organic material, or a laminated film thereof can be used.

The TFT 50 and a pixel area 51 are provided in an area surrounded with the gate wire 11L and the source wires 12L. It is to be noted that in FIG. 1, an example in which the TFT 50 is arranged in a different area from the pixel area 51, but a configuration may be employed that a part of the TFT or the whole TFT is provided in the pixel area.

The plate-shaped electrodes 14 are, as shown in FIG. 1, provided almost all over each of the pixel areas 51. The plate-shaped electrode 14 is connected to the TFT 50 as the switching element. Specifically, the drain electrode 13 and the plate-shaped electrode 14 are electrically connected to each other through the contact hole CH3, whereby the plate-shaped electrode 14 is connected to the TFT 50. As a result of this, when the TFT 50 is switched on, a display signal supplied to the source wires 12L is written in the plate-shaped electrode 14.

The slit electrodes 15 are formed on the third interlayer insulating film 24. The slit electrodes 15 are formed of a transparent conducting material, such as ITO (Indium Tin Oxide) and IZO (Indium Zinc Oxide). A pattern of the slit electrodes 15 is, as shown in FIGS. 1 and 2, formed so as to have the apertures OP1 to OP6. In the pixel area 51, the slit electrodes 15 are arranged opposite to the plate-shaped electrode 14 through the third interlayer insulating film 24. The apertures OP2 to OP6 of the slit electrodes 15 are slit-like narrow apertures extending in a direction almost parallel to the source wire 12L. In other words, in the pixel area 51, due to the apertures OP2 to OP6, the slit electrodes 15 are provided with branching portions composed of line-like narrow patterns extending substantially parallel to the source wires 12L, and narrow connecting portions where the each branching portion is connected to each other at both ends of the branching portion. A probability of disconnection can be reduced by providing the connecting portions. In addition, it becomes possible to supply a common potential to the each line-like pattern (branching portion) of the slit electrodes. Meanwhile, the aperture OP1 is provided on the TFT 50.

Figure 3:
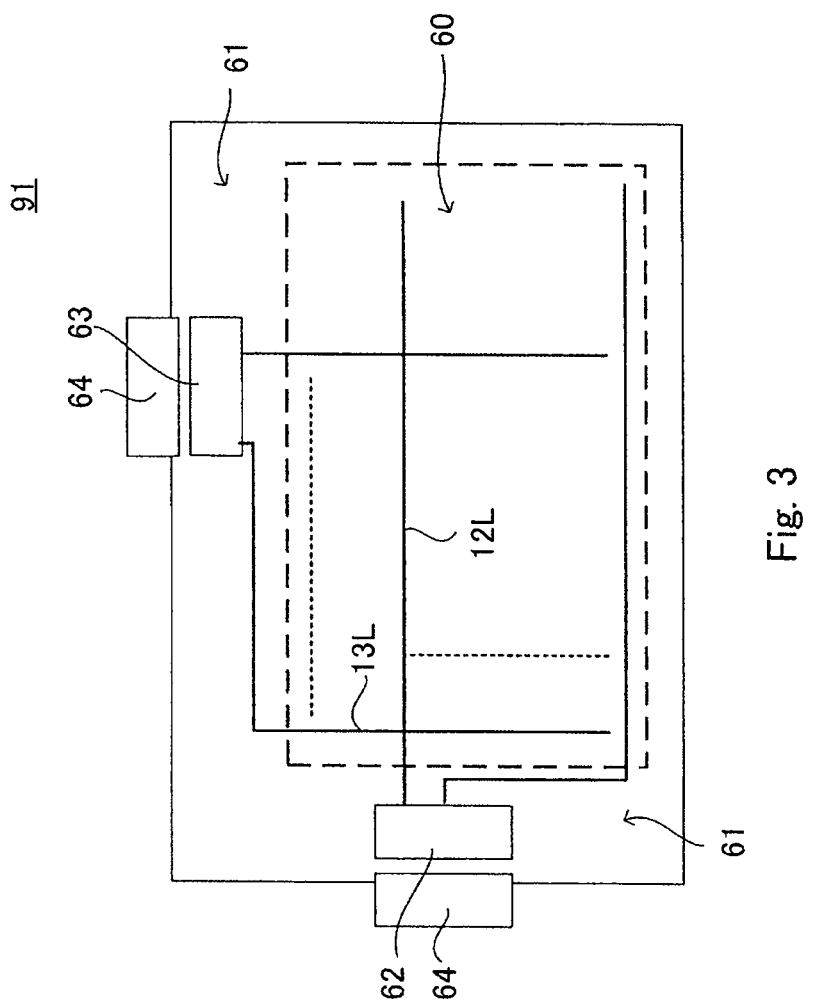
FIG. 3 is a schematic plan view of the TFT array substrate in accordance with the first exemplary embodiment.

A schematic plan view of the whole TFT array substrate 91 is shown in FIG. 3. A display area 60 shown in FIG. 3 is an area in which the pixel area 51 is formed. A frame area 61 is formed outside the display area 60. A gate driving circuit 62 to be connected to the gate wire 11L and a source driving circuit 63 to be connected to the source wires 12L, etc. are formed in the frame area 61. Wires (not shown) extend from the gate driving circuit 62 and the source driving circuit 63 to terminals (not shown), through which the wires are connected to the wiring substrates 64.

When a polycrystalline silicon layer etc. are applied to the semiconductor layer 3, the above-described configuration of the TFT 50 can be applied to the gate driving circuit 62 or the source driving circuit 63. This enables a field effect mobility (μ) to be increased. In addition, a shift amount Vth at a long time operation can be reduced. As a result of this, improved TFT performance and enhanced reliability can be achieved. Further, the number of components of an IC chip can be decreased since the TFT in the pixel area, the TFT of the gate driving circuit and the TFT of the source driving circuit can be formed at the same time.

Namely, reduction of weight and volume, and further reduction in size can be expected. Note that as mentioned above, it goes without saying that an amorphous semiconductor layer may be applied to the semiconductor layer 3.

The TFT array substrate 91 in accordance with the first exemplary embodiment is provided with the configuration as described above. The liquid crystal display device in accordance with the first exemplary embodiment is then further provided with the following members. Namely, a passivation film (not shown) and an orienting film (not shown) for controlling the orientation of liquid crystal molecules are formed on the slit electrodes 15. In addition, on the other surface of the insulating substrate 1, disposed is an optical film made of a polarizing plate, an optical compensation film, etc.

It is to be noted that the above-described structure of the TFT array substrate 91 is an example, and the present invention can apply to all the liquid crystal display devices in the FFS mode. For example, in the above description, the example has been explained that the pixel electrode is used as the plate-shaped electrode and the common electrode as the slit electrode, but the pixel electrode may be used as the slit electrode and the common electrode as the plate-shaped electrode. In this case, the TFT array substrate may be configured so that the drain electrode is connected to the slit electrode, and a common potential is supplied to the plate-shaped electrode. In addition, the configuration of the slit electrode 15 is not limited to the above, but a configuration that has a plurality of slit-like apertures may be employed so as to form a plurality of line-like patterns substantially in a same direction as either the source wire or the gate wire, and thus various modifications can be performed. For example, instead of the configuration that the both ends of the branching portion have the connecting portions, a pectinate configuration may be employed that one end of the branching portion has the connecting portion. Further, the example of the top gate type configuration of the TFT 50 has been explained, but a bottom gate type may be employed. The bottom gate type allows forming the TFT with smaller number of masks than the top gate type, thus enabling to reduce manufacturing processes and cost.

COMPARATIVE EXAMPLE

Figure 12:
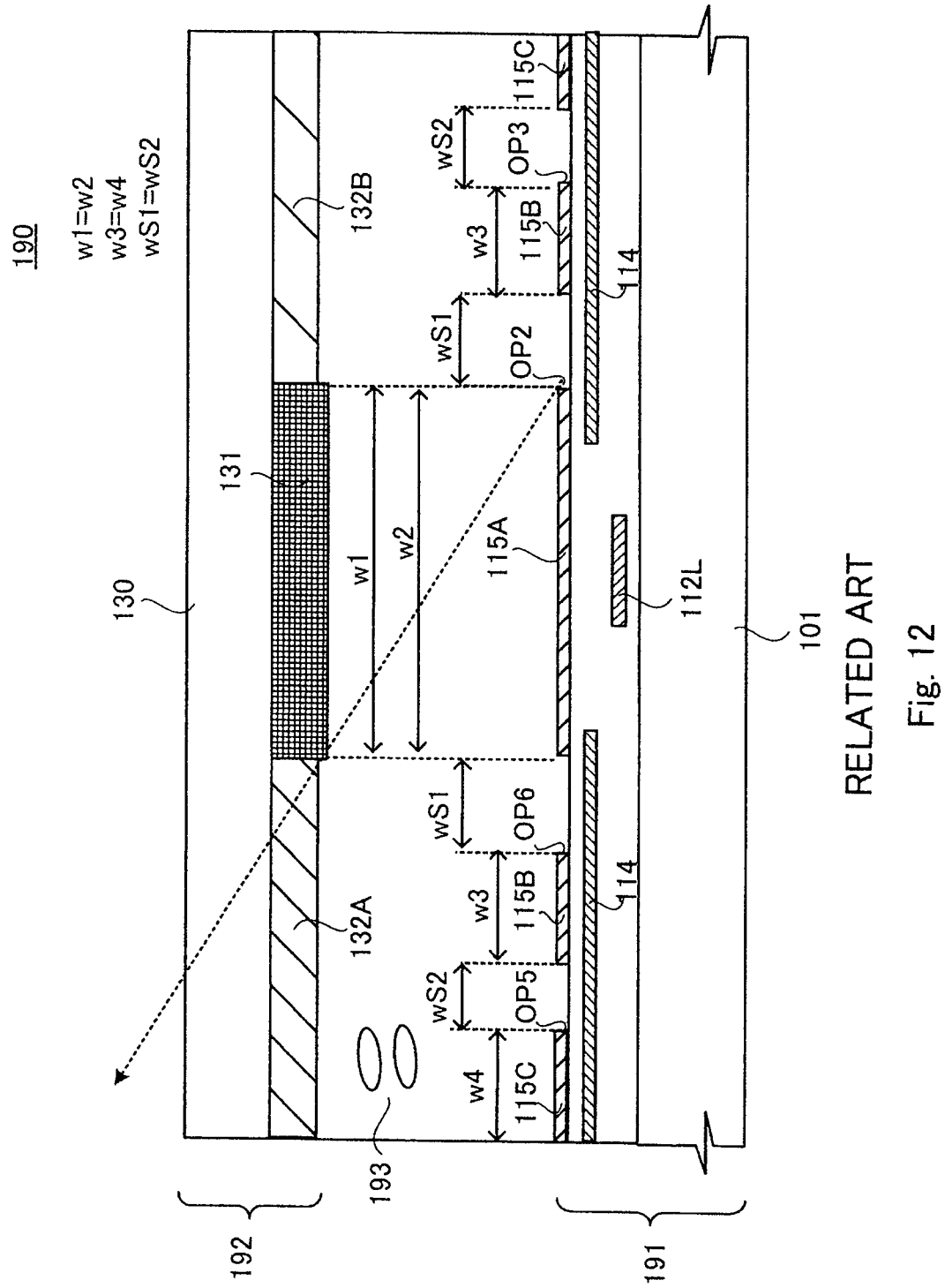
FIG. 12 is a schematic sectional view of a liquid crystal display panel in accordance with a comparative example.

First, a comparative example will be explained before explaining characteristics of the present invention. In FIG. 12 shown is an enlarged partial sectional view of a liquid crystal display panel in accordance with the comparative example. For the purpose of explanation, members to be explained are only shown.

In a liquid crystal display panel 190, a TFT array substrate 191 and a color filter substrate 192 are arranged opposite to each other with a predetermined gap being therebetween. There is provided a liquid crystal layer 193 in the gap between the TFT array substrate 191 and the color filter substrate 192. A light shielding film 131, color filter films 132, etc. are provided on an insulating substrate 130 that constitutes the color filter substrate 192. In addition, optical films, such as a polarizing plate (not shown) and an optical compensation film (not shown), are provided on the other surface of the color filter substrate 192. Further, a source wire 112L, plate-shaped electrodes 114, slit electrodes 115A, 115B, and 115C, etc. are provided on an insulating substrate 101 that constitutes the TFT array substrate 191.

Here, for the purpose of explanation, the slit electrode 115 arranged above and opposite to the source wire 112L is defined as an S-slit electrode 115A. In addition, the slit electrode 115 arranged adjacent to the S-slit electrode 115A through the slit-like apertures OP2 and OP6 is defined as an N-slit electrode 115B. Further, the slit electrodes 115 other than the S-slit electrode 115A and the N-slit electrode 115B are defined as E-slit electrodes 115C. It is to be noted that the S-slit electrode 115A is arranged opposite to the light shielding film 131 through the liquid crystal layer 193.

In addition, as shown in FIG. 12, a width of the light shielding film 131 is defined as w1, and that of the S-slit electrode 115A arranged above and opposite to the source wire 112L is defined as w2.

Further, a width of the N-slit electrode 115B adjacent to the S-slit electrode 115A is defined as w3, and that of the E-slit electrodes 115C other than the S-slit electrode 115A and the N-slit electrode 115B is defined as w4.

The light shielding film 131 is disposed above the source wire 112L so as to extend from a pixel to an adjacent pixel substantially in a same direction as the source wire 112L. The width w1 of the light shielding film 131 is set to a distance that can prevent the color mixture of the color filter films 132A and 132B as viewed from an oblique angle.

In the comparative example, a distance between the TFT array substrate 191 and the color filter substrate 192 is set to 3 µm, and the width of the S-slit electrode 115A is set to 9 µm. In the comparative example, the light shielding film 131 whose width w1 is equal to 9 µm is arranged above the S-slit electrode 115A so that a single color display may not be mixed when viewed from 45 degrees angle. In other words, the width w1 of the light shielding film 131 is set to be equal to the width w2 of the S-slit electrode 115A, and the film and the electrode are arranged so as to overlap to each other as viewed from a plane (refer to FIG. 12).

In addition, a width wS1 of a slit-like aperture OP between the S-slit electrode 115A and the N-slit electrode 115B is set to be equal to a width wS2 of the slit-like aperture OP between the N-slit electrode 115B and the E-slit electrode 115C, and to the width wS2 of the slit-like aperture OP between the E-slit electrodes 115C. Namely, it is set to wS1=wS2. Specifically, when a size of one pixel is set to 43.5 µm×130.5 µm, wS1 is set to be equal to wS2, 4.5 µm.

Figure 13:
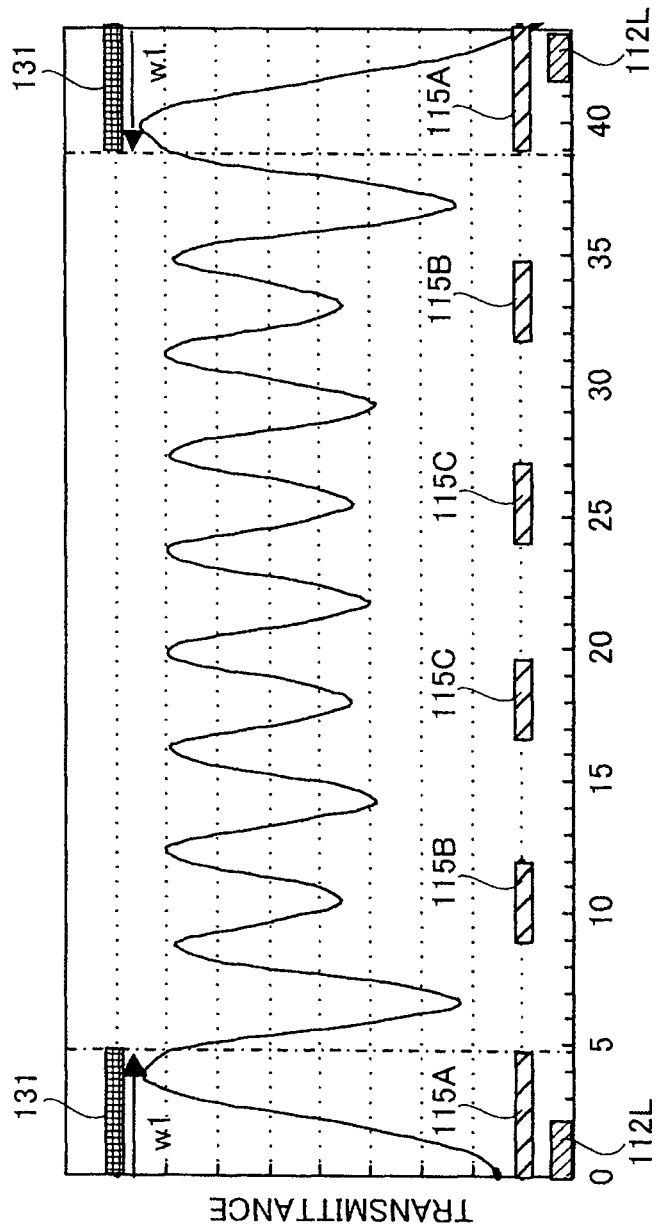
FIG. 13 is a graph showing a transmittance of the liquid crystal display panel in accordance with the comparative example.

In FIG. 13, shown is a transmittance distribution graph taken from a line corresponding to a line VI-VI of FIG. 1 of the liquid crystal display panel 190 in accordance with the comparative example. As is apparent from FIG. 13, a portion corresponding to an end of the S-slit electrode 115A in a width direction has a highest transmittance. However, the light shielding film 131 is disposed on this portion with the highest transmittance. Hence, this has led to decrease in the transmittance in the comparative example.

Figure 4:
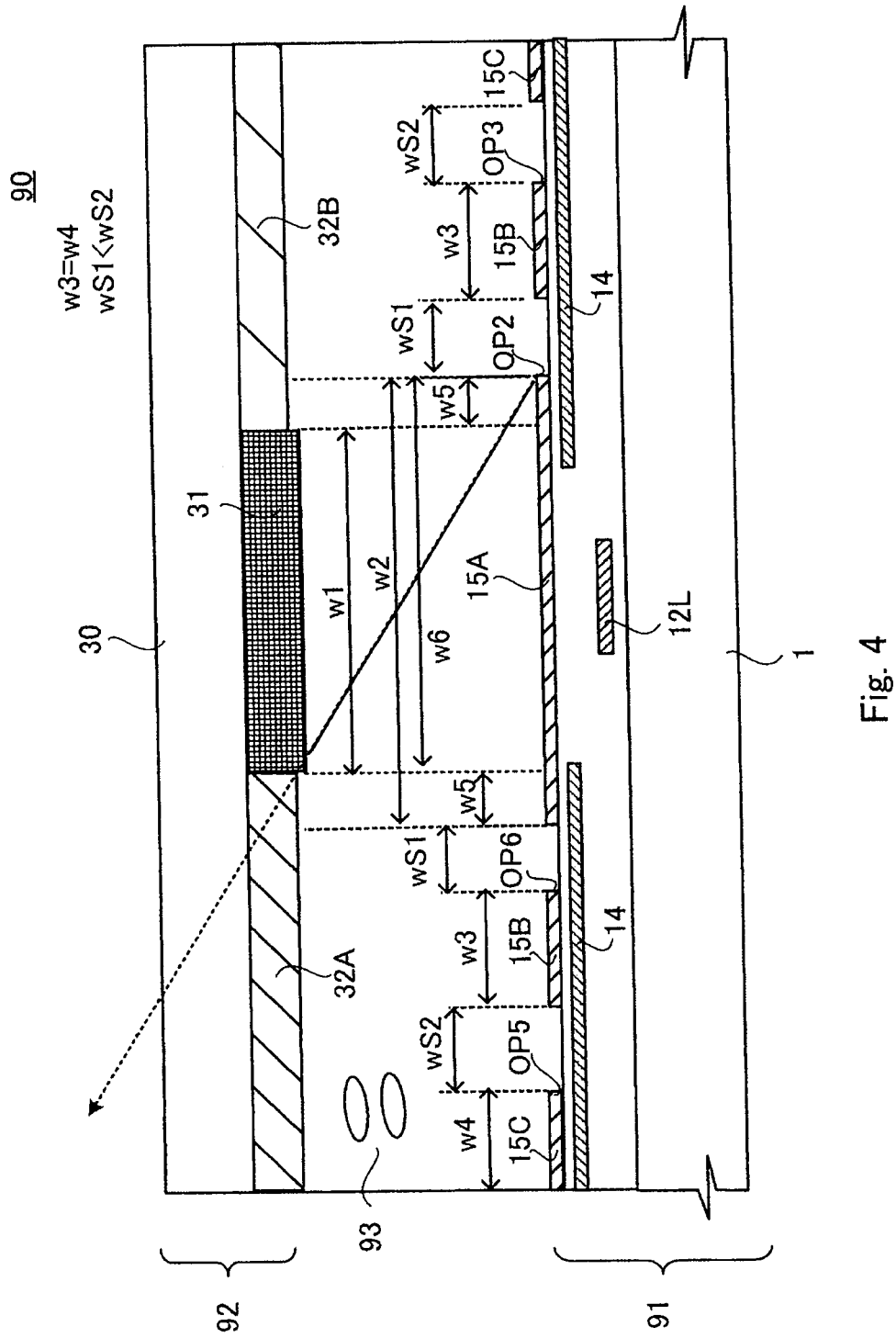
FIG. 4 is a schematic sectional view of a liquid crystal display panel in accordance with the first exemplary embodiment.

Next, the characteristics of the present invention will be explained. In FIG. 4, shown is a schematic enlarged partial sectional view of the liquid crystal display panel 90 in accordance with the first exemplary embodiment. For illustration purposes, only a member to describe is shown in the figure. FIG. 4 is a schematic view taken from a line corresponding to the line VI-VI of FIG. 1. In FIG. 4, the source wire 12L is located in the center.

In the liquid crystal display panel 90, the TFT array substrate 91 and a color filter substrate 92 that works as a second substrate are arranged opposite to each other with a predetermined gap being therebetween. There is provided a liquid crystal layer 93 in the gap between the TFT array substrate 91 and the color filter substrate 92. A light shielding film 31 that works as a black matrix, a color filter film 32, etc. are provided on the color filter substrate 92.

In the color filter film 32, for example, a plurality of three stripe color patterns of blue (B), green (G), and red (R) are arranged with a predetermined alignment in parallel. Methods for forming such color patterns include various methods, such as a pigment dispersion method, a staining method, a printing method, a deposition method, and an electrodeposition method. In the first exemplary embodiment, a certain color filter film (for example, R) is arranged between the source wires 12L. An other color filter film (for example, G or B) is arranged between adjacent other source wires 12L. In other words, color filter films composed of a group of RGB are iteratively aligned in a stripe manner.

The light shielding film 31 is arranged between the different color filters, and thereby has a function to partition the color filter film 32 to prevent color mixture. The light shielding film 31 in accordance with the first exemplary embodiment is, as shown in FIG. 4, arranged above the source wire 12L and is extended substantially in the same direction as the source wire 12L. In addition, optical films, such as a polarizing plate (not shown) and an optical compensation film (not shown), are provided on the other surface of the color filter substrate 92.

In the liquid crystal display device configured as described above, a predetermined voltage is supplied to the gate wire 11L, whereby the TFT 50 is switched on, and then a display signal supplied to the source wire 12L is written in the plate-shaped electrode 14. A potential difference is then generated between the plate-shaped electrode 14 and the slit electrode 15, thereby generating an electric field. This electric field acts on liquid crystal molecules (not shown) that constitutes the liquid crystal layer, and rotates the liquid crystal molecules mainly in a surface parallel to the substrate.

Here, for the purpose of explanation, the slit electrode 15 arranged above and opposite to the source wire 12L is defined as an S-slit electrode 15A. The slit electrode 15 arranged adjacent to the S-slit electrode 15A through the slit-like aperture OP is then defined as an N-slit electrode 15B. In addition, the slit electrodes other than the S-slit electrode 15A and the N-slit electrode 15B are defined as E-slit electrodes 15C. It is to be noted that the S-slit electrode 15A is arranged opposite to the light shielding film 31 through the liquid crystal layer 93.

In addition, as shown in FIG. 4, a width of the light shielding film 31 is defined as w1, and that of the S-slit electrode 15A arranged above and opposite to the source wire 12L is defined as w2. Further, a width of the N-slit electrode 15B adjacent to the S-slit electrode 15A is defined as w3, and a width of the E-slit electrodes 15C other than the S-slit electrode 15A and the N-slit electrode 15B is defined as w4. Still further, a width of the S-slit electrode 15A protruding from the light shielding film 31 is defined as w5.

The S-slit electrode 15A in accordance with the first exemplary embodiment is disposed so as to protrude from the light shielding film 31 in a width direction. In addition, the protrusion width w5 is set to be substantially the same length at both ends of the S-slit electrode 15A. For the purpose of explanation, a distance is defined as w6 from one end of the S-slit electrode 15A to a point completely opposite to the light shielding film 31. Further, a width of the slit-like aperture OP between the S-slit electrode 15A and the N-slit electrode 15B is defined as wS1, and both a width of the slit-like aperture OP between the N-slit electrode 15B and the E-slit electrode 15C, and a width of the slit-like aperture OP between the E-slit electrodes 15C is defined as wS2.

The light shielding film 31 is disposed above the source wire 12L so as to extend from a pixel to an adjacent pixel substantially in the same direction as the source wire 12L. The light shielding film 31 is disposed so as to have a role in preventing color mixture of the color filter films 32A and 32B as viewed from an oblique angle. Namely, the width w1 of the light shielding film 31 is set to a distance that can prevent the color mixture of the color filter films 32A and 32B as viewed from an oblique angle.

In the first exemplary embodiment, positions of the S-slit electrode 15A, the light shielding film 31, etc. are set so as to meet the following conditions.

$$wS1 < wS2 \qquad \text{<Condition 1>}$$

In addition, it is set to wS2−wS1=w5. Namely, the width wS1 of the slit-like aperture OP between the S-slit electrode 15A and the N-slit electrode 15B is set to be smaller than the width wS2 of the slit-like aperture OP between the N-slit electrode 15B and the E-slit electrode 15C, and of the slit-like aperture OP between the E-slit electrodes 15C. Simultaneously, the width of the both ends of the S-slit electrode 15A is set to be larger by w5 than that of the comparative example. Specifically, when a size of one pixel is set to 43.5 μm×130.5 μm, wS2 is set to 4.5 μm and wS1 is 4.0 μm. Further, w5 is set to 0.5 μm. Meanwhile, it is set to w3=w4. Namely, the width w3 of the N-slit electrode 15B adjacent to the S-slit electrode 15A is set to be the same as the width w4 of the E-slit electrodes 15C other than the S-slit electrode 15A and the N-slit electrode 15B.

$$w6=9 \text{ μm} \qquad \text{<Condition 2>}$$

Figure 5:
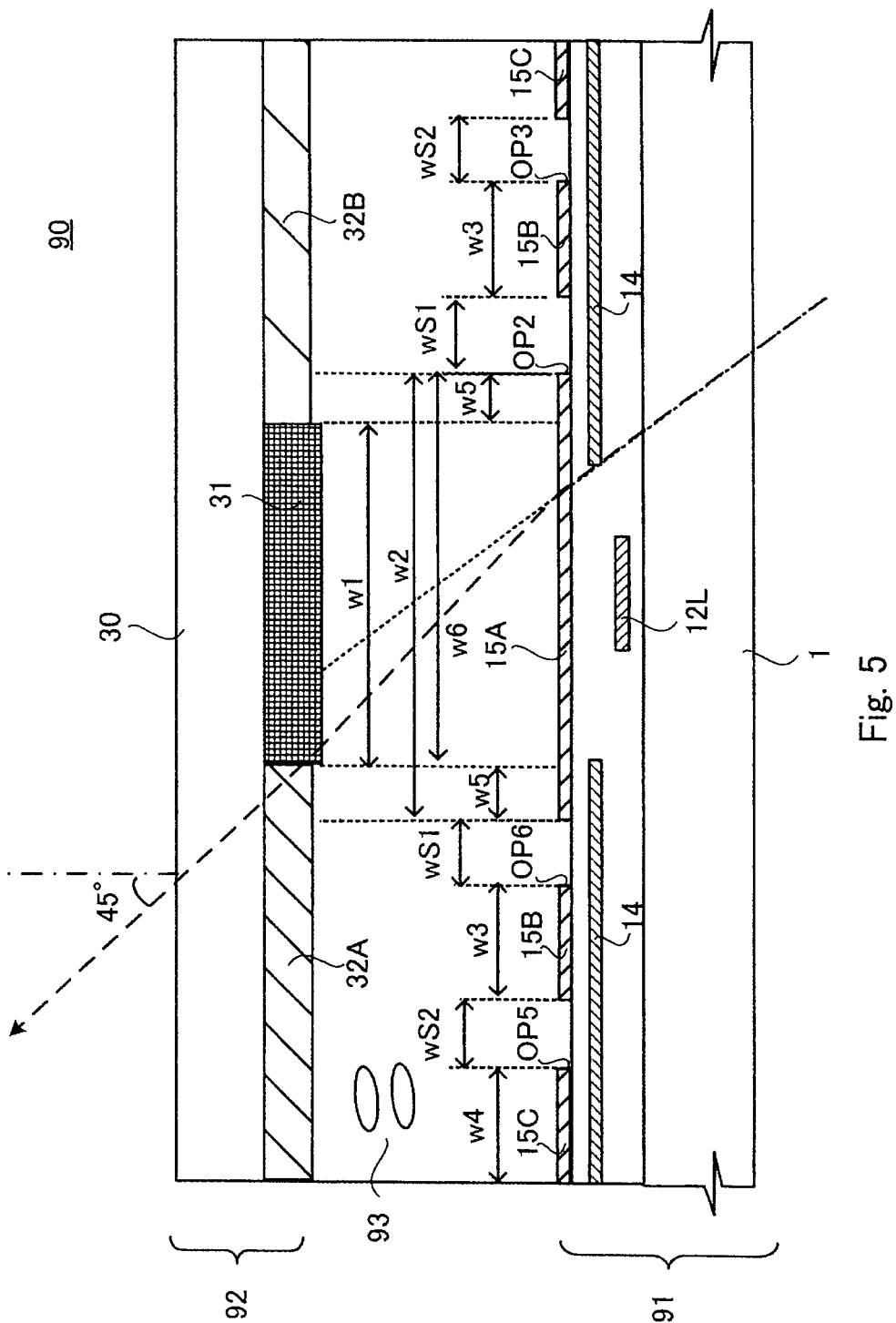
FIG. 5 is a schematic sectional view of the liquid crystal display panel in accordance with the first exemplary embodiment.

A most suitable value of the width w6 (which is equal to w1+w5), which is from the one end of the S-slit electrode 15A to the point completely opposite to the light shielding film 31, is determined in view of an oblique viewing angle, distances from the TFT array substrate 91 and the color filter substrate 92, an optical path difference of a light that passes through a liquid crystal driving area on the S-slit electrode 15A and that passes through layers with different refractive indexes, etc. (refer to FIG. 5). This time, the distances between the TFT array substrate 91 and the color filter substrate 92 are set to 1 to 5 μm, and it is set to w6=w1+w5, which is equal to 9 μm, as a required amount for the color mixture not to occur even when viewed from 45 degrees angle. Based on this, a value of the width w1 of the light shielding film 31 is adjusted so that w1 may be equal to 8.5 μm. The above-described configuration, as shown in FIG. 5, enables to prevent the color mixture from occurring when viewed from 45 degrees angle and to prevent the transmittance from decreasing.

Figure 6:
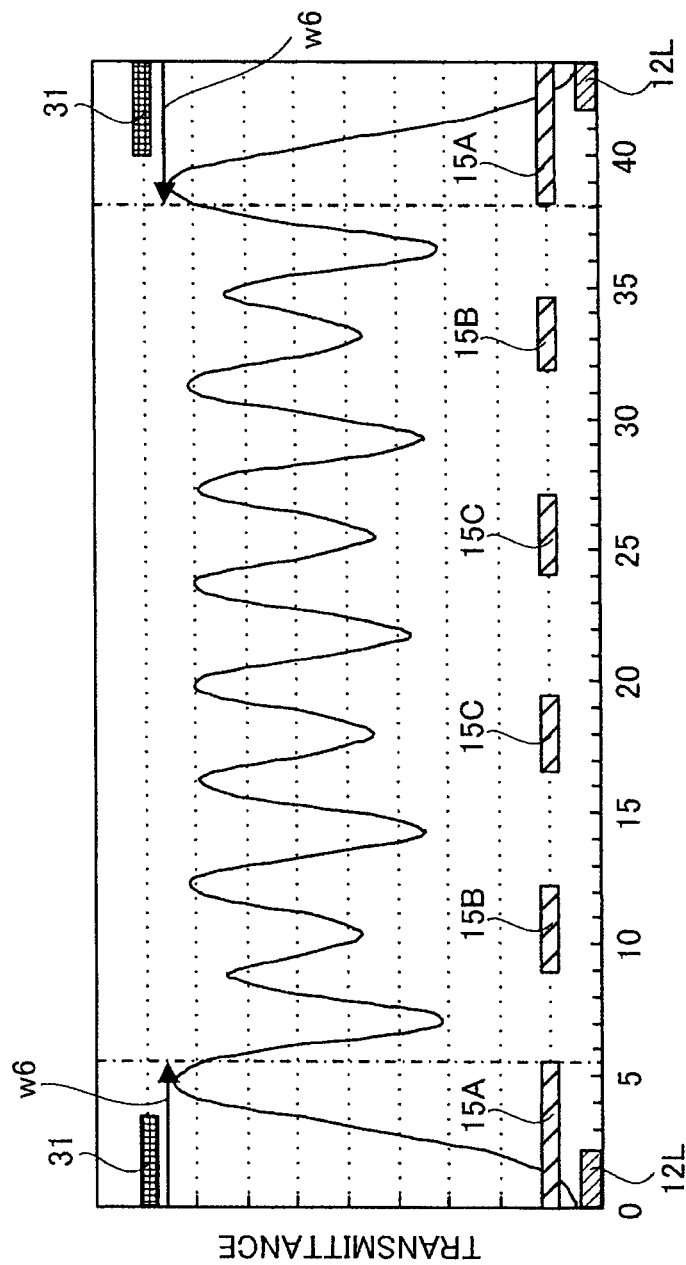
FIG. 6 is a graph showing a transmittance of the liquid crystal display panel in accordance with the first exemplary embodiment.

In FIG. 6, shown is a transmittance distribution graph taken from a line corresponding to the line VI-VI of FIG. 1 of the liquid crystal display panel 90 in accordance with the first exemplary embodiment. As is apparent from FIG. 6, a portion corresponding to an end of the S-slit electrode 15A in a width direction has a highest transmittance. It prevented the shading film 31 from being disposed on this portion with the highest transmittance. Accordingly, the transmittance can be improved.

In the liquid crystal display device in the FFS mode, an electric field of an edge of the slit electrode is strongly generated, and thus liquid crystal molecules rotates well. For that reason, a transmittance of the edge becomes higher than that of the other portions of the electrode. According to the first exemplary embodiment, the light shading film 31 is disposed in the upper part of the source wire so that so-called compound color that the color of the pixel to be adjacent as viewed from an oblique angle mixes when the single color is displayed does not occur. Further, the light shading film 31 is not disposed in the upper part of the edge portion of the slit electrode. As a result of them, transmittance can be enhanced.

Figure 7:
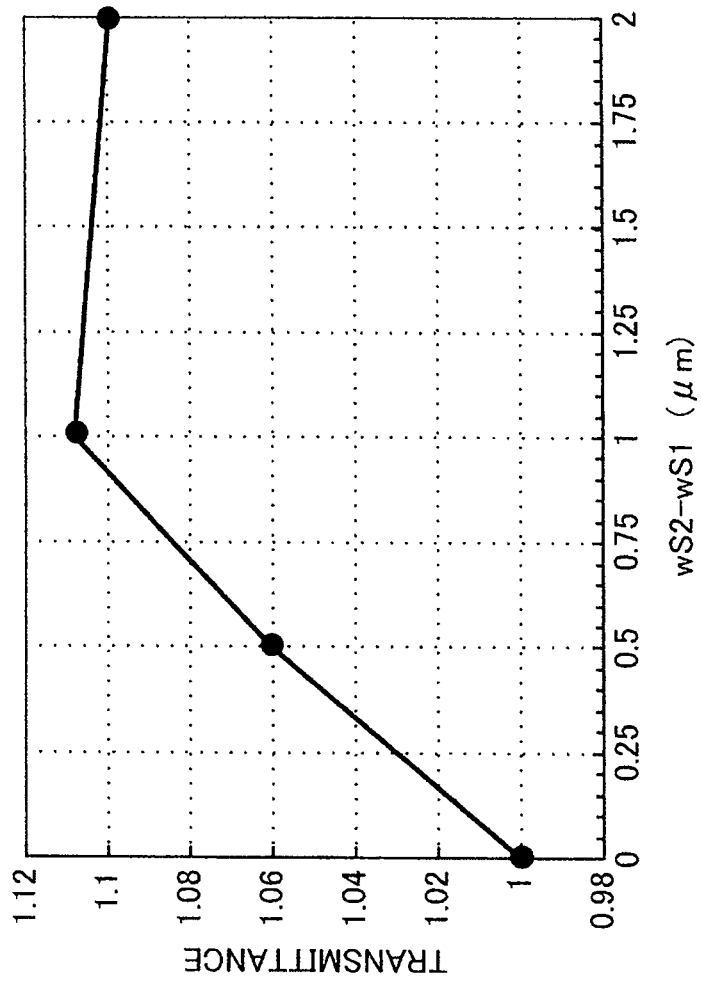
FIG. 7 is a graph showing a transmittance with respect to a reduced width between slit electrodes of the liquid crystal display panel in accordance with the first exemplary embodiment.

FIG. 7 is a graph showing a transmittance with respect to a reduced width between slit electrodes. In FIG. 7, it was fixed to wS2=4.5 μm, and it was changed to wS1=4.5 μm, 4.0 μm, 3.5 μm, or 2.5 μm. In addition, w5 was set to become equal to wS2−wS1. A horizontal axis indicates a value of wS2−wS1. Namely, the value indicates a reduced width of the apertures of the slit electrodes. A vertical axis indicates a normalized transmittance. Specifically, transmittance of wS2−wS1=0 (a reduced width of the apertures of the slit electrodes is zero) is set to 1. Referring to FIG. 7, it can be seen that reducing a slit distance improves a transmittance. In addition, when wS1 is 3.5 or 2.5 μm, it has been confirmed that the same graph as FIG. 6 can be obtained.

According to the first exemplary embodiment, the width wS1 of the slit-like aperture OP arranged above both sides of the source wire 12L is made smaller than the width wS2 of the other slit-like apertures OP, whereby the light shielding film 31 can be arranged more inside than the edge of the S-slit electrode 15A. Consequently, even though the width w6 is set to 9 μm, the light shielding film 31 stops shielding the edge of the S-slit electrode 15A. As a result of this, the transmittance can be improved preventing color mixture when displayed in a single color. In addition, improvement of the transmittance allows to reduce power consumption of a back light with respect to required brightness specification, and to achieve energy saving.

Further, a wide viewing angle, high brightness, and a high aperture ratio can be achieved since the FFS mode is employed. Hence, according to the first exemplary embodiment, a liquid crystal display device that can achieve a wide viewing angle, high brightness, a high display quality, and energy saving can be provided.

[Second Exemplary Embodiment]

Next, an example of a liquid crystal display panel different from the above-described first exemplary embodiment is described. In the drawings described below, the same component members as in the above-described first exemplary embodiment have the same reference numerals, and explanations thereof are arbitrarily omitted.

Figure 8:
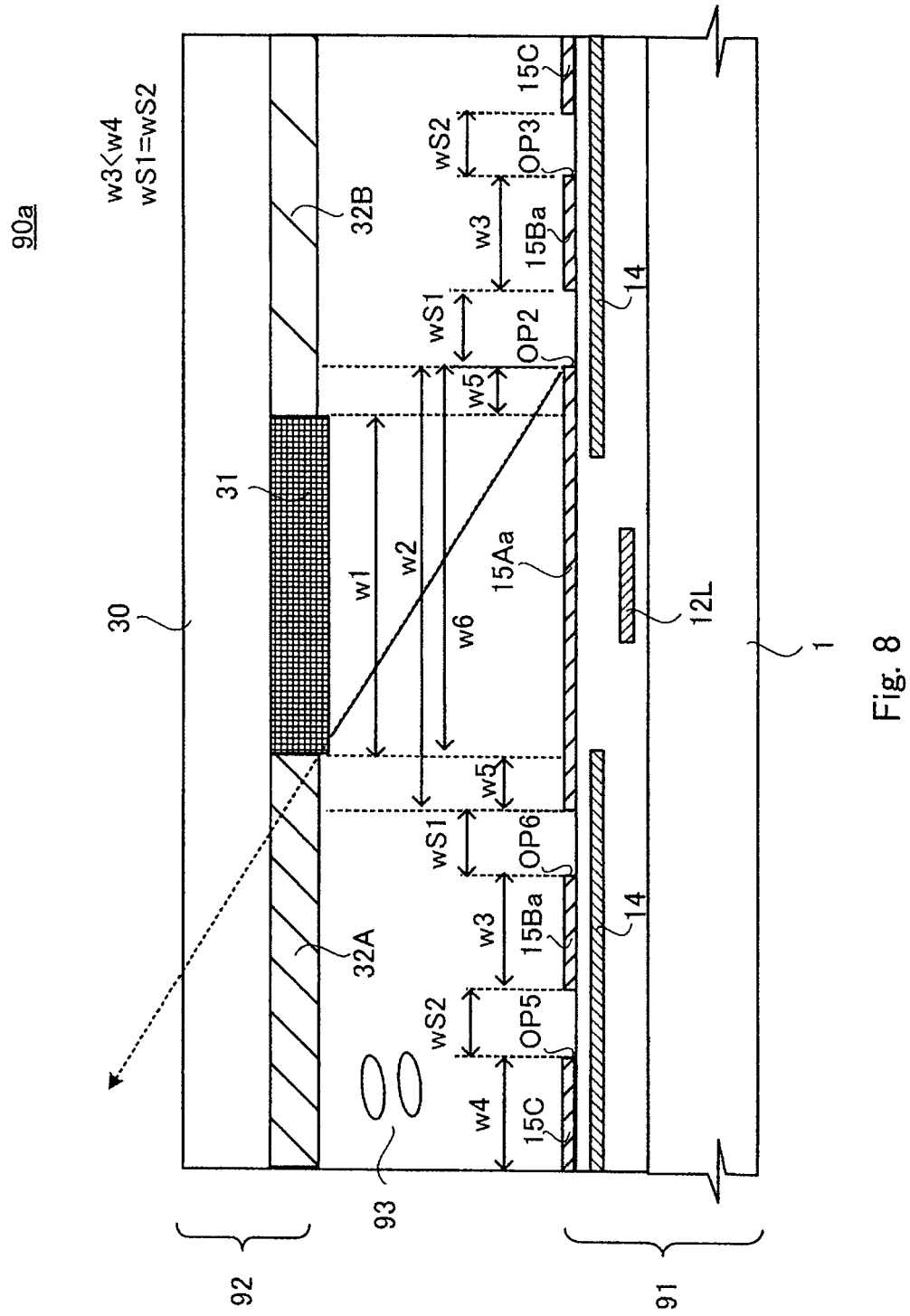
FIG. 8 is a schematic sectional view of a liquid crystal display panel in accordance with a second exemplary embodiment of the present invention.

In FIG. 8, shown is a schematic enlarged partial sectional view of the liquid crystal display panel 90 in accordance with a second exemplary embodiment. In the second exemplary embodiment, various values are set so as to meet the following conditions.

$$w3<w4 \qquad <\text{Condition 1}>$$

Namely, a width w3 of an N-slit electrode 15Ba adjacent to an S-slit electrode 15Aa is set to be smaller than a width w4 of the E-slit electrodes 15C other than the S-slit electrode 15Aa and the N-slit electrode 15Ba. Simultaneously, the width of both ends of the S-slit electrode 15Aa is set to be larger by a width w5 than that of the comparative example. Specifically, when a size of one pixel is set to 43.5 μm×130.5 μm, w3 is set to 2.5 μm and w4 is set to 3.0 μm. Meanwhile, it is set to wS1=wS2. Specifically, it is set to wS1=wS2=4.5 μm. In addition, w5 is set to 0.5 μm.

$$w6=9 \text{ μm} \qquad <\text{Condition 2}>$$

A most suitable value of the width w6 (which is equal to w1+w5), which is from the one end of the S-slit electrode 15Aa to the point completely opposite to the light shielding film 31, is determined in view of an oblique viewing angle, distances between the TFT array substrate 91 and the color filter substrate 92, an optical path difference of a light that passes through a liquid crystal driving area on the S-slit electrode 15Aa and that passes through layers with different refractive indexes, etc. The distances between the TFT array substrate 91 and the color filter substrate 92 are set to 1 to 5 μm, and it is set to w6=w1+w5, which is equal to 9 μm, as a required amount for the color mixture not to occur even when viewed from 45 degrees angle. Based on this, a value of the width w1 of the light shielding film 31 is adjusted so that w1 may be equal to 8.5 μm. The above-described configuration, as shown in FIG. 5, enables to prevent the color mixture from occurring when viewed from 45 degrees angle and to prevent the transmittance from decreasing.

Figure 9:
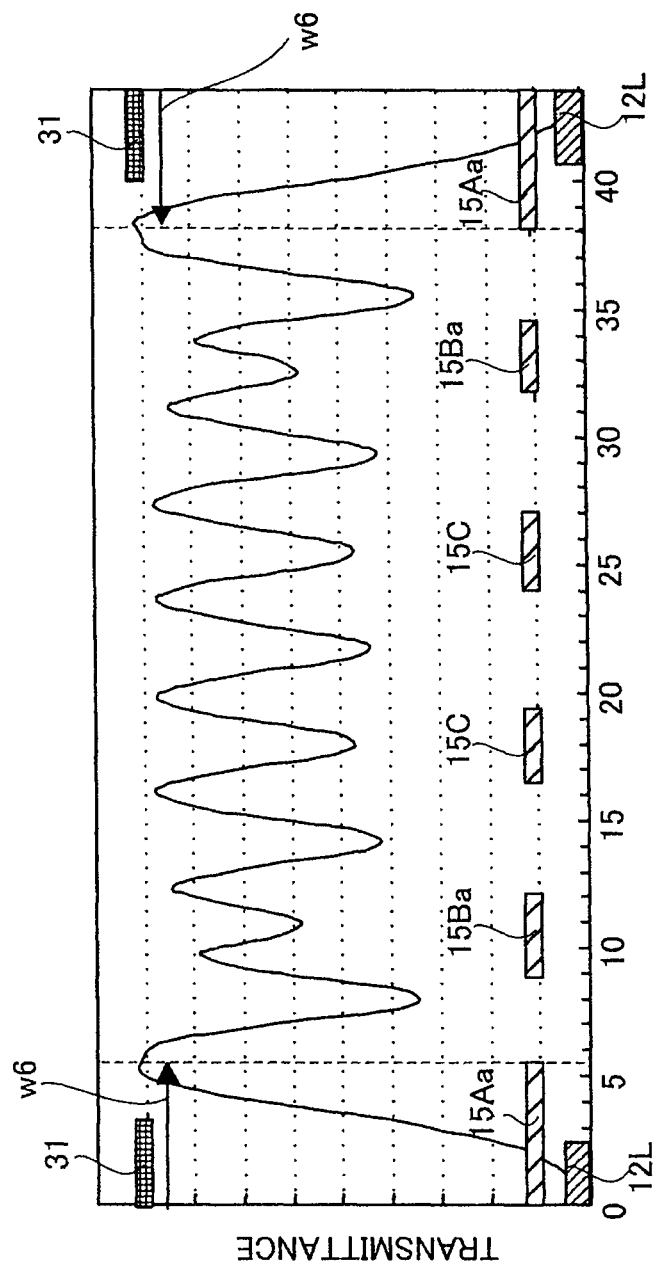
FIG. 9 is a graph showing a transmittance of the liquid crystal display panel in accordance with the second exemplary embodiment.

In FIG. 9, shown is a transmittance distribution graph taken from a line corresponding to the line VI-VI of FIG. 1 of a liquid crystal display panel 90a in accordance with the second exemplary embodiment. As is apparent from FIG. 9, a position corresponding to an end of the S-slit electrode 15Aa in a width direction has a highest transmittance. It prevented the shading film 31 from being disposed on this portion with the highest transmittance. Accordingly, the transmittance can be improved.

Figure 10:
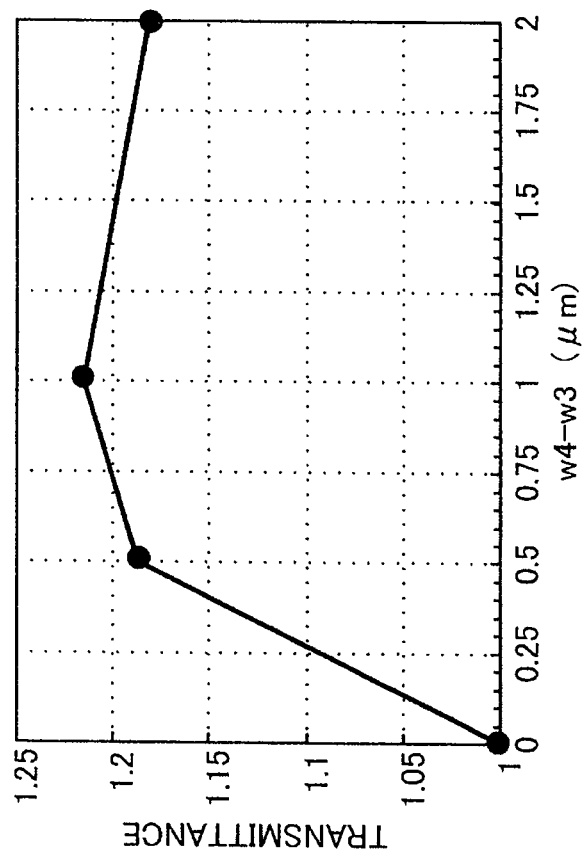
FIG. 10 is a graph showing a transmittance with respect to a reduced width between slit electrodes of the liquid crystal display panel in accordance with the second exemplary embodiment.

FIG. 10 is a graph showing a transmittance with respect to a reduced width of the slit electrodes. In FIG. 10, it was fixed to w4=3.0 μm, and it was changed to w3=3.0 μm, 2.5 μm, 2.0 μm, or 1.0 μm. A horizontal axis indicates a value of w4−w3. Namely, it is a reduced value of the width of the slit electrode. A vertical axis indicates a normalized transmittance. Specifically, transmittance of w4−w3=0 (a reduced width of the slit electrodes is zero) is set to 1. Referring to FIG. 10, it can be seen that reducing a slit distance improves a transmittance. In addition, when w3 is 2.0 or 1.0 μm, it has been confirmed that the same graph as FIG. 9 can be obtained.

According to the second exemplary embodiment, the width w3 of the N-slit electrode 15Ba adjacent to the S-slit electrode 15Aa arranged above the source wire 12L is made smaller than the width w4 of the E-slit electrodes 15C other than the S-slit electrode 15Aa and the N-slit electrode 15Ba, whereby the light shielding film 31 can be arranged more inside than an edge of the S-slit electrode 15Aa. Consequently, even if the width w6 is set to 9 μm, the light shielding film 31 stops shielding the edge of the S-slit electrode 15Aa. As a result of this, the transmittance can be improved. In addition, improvement of the transmittance allows reducing power consumption of a back light with respect to required brightness specification.

Further, because the FFS mode is employed, a liquid crystal display device that can achieve a wide viewing angle, high brightness, a high display quality, and energy saving can be provided.

[Third Exemplary Embodiment]

Next, an example of a liquid crystal display panel different from the above-described second exemplary embodiment is described. In a third exemplary embodiment, various values are set so as to meet the following conditions.

Figure 11:
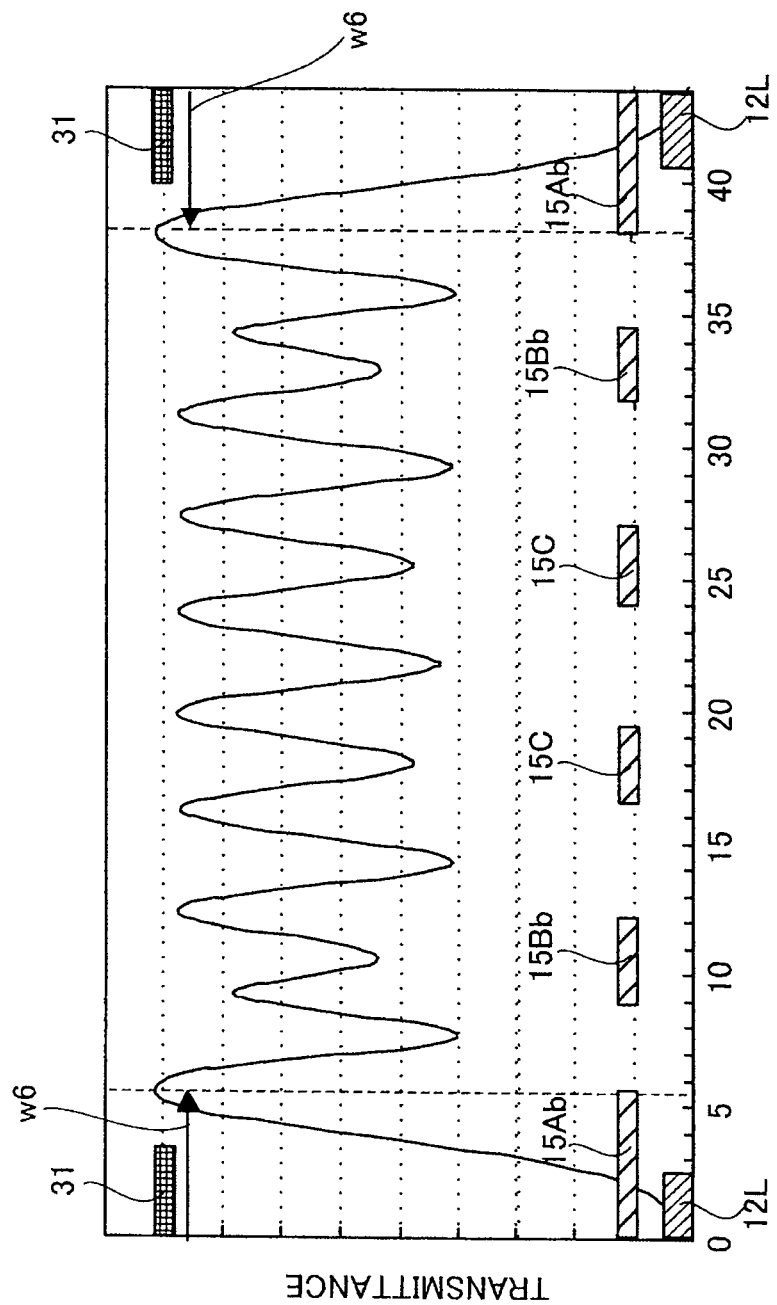
FIG. 11 is a graph showing a transmittance of a liquid crystal display panel in accordance with a third exemplary embodiment of the present invention.

In FIG. 11, shown is a transmittance distribution graph in an area corresponding to the line VI-VI of the first exemplary embodiment in the liquid crystal display panel in accordance with the third exemplary embodiment.

$$wS1<wS2 \qquad <\text{Condition 1}>$$

Namely, a width wS1 of the slit-like aperture OP between an S-slit electrode 15Ab and an N-slit electrode 15Bb is set to be smaller than a width wS2 of the slit-like aperture OP between the N-slit electrode 15Bb and the E-slit electrode 15C, and of the slit-like aperture OP between the E-slit electrodes 15C. Simultaneously, the width of both ends of the S-slit electrode 15Ab is set to be larger than that of the comparative example. Specifically, when a size of one pixel is set to 43.5 μm×130.5 μm, wS2 is set to 4.5 μm and wS1 is set to 4.0 μm.

$$w3<w4 \qquad <\text{Condition 2}>$$

Namely, the width w3 of the N-slit electrode 15Bb adjacent to the S-slit electrode 15Ab is set to be smaller than the width w4 of the E-slit electrodes 15C other than the S-slit electrode 15Ab and the N-slit electrode 15Bb. Simultaneously, the width of the both ends of the S-slit electrode 15Ab is set to be larger than that of the comparative example. Specifically, when a size of one pixel is set to 43.5 μm×130.5 μm, w3 is set to 2.5 μm and w4 is set to 3.0 μm. The width w5 is determined based on the conditions 1 and 2. Namely, w5 is set to 1.0 μm.

$$w6=9 \text{ μm} \qquad <\text{Condition 3}>$$

A most suitable value of the width w6 (which is equal to w1+w5), which is from one end of the S-slit electrode 15Ab to the point completely opposite to the light shielding film 31, is determined in view of an oblique viewing angle, distances between the TFT array substrate 91 and the color filter substrate 92, an optical path difference of a light that passes through a liquid crystal driving area on the S-slit electrode 15Ab and that passes through layers with different refractive indexes, etc. The distances between the TFT array substrate 91 and the color filter substrate 92 are set to 3 μm. It is set to w6=w1+w5, which is 9 µm, and w5 is equal to 1.0 µm as a required amount for the color mixture not to occur even when viewed from 45 degrees angle. Based on this, a value of the width w1 of the light shielding film 31 is adjusted so that w1 may be equal to 8.0 µm. The above-described configuration, as shown in FIG. 5, enables to prevent the color mixture from occurring when viewed from 45 degrees angle and to prevent the transmittance from decreasing.

As is apparent from FIG. 11, setting the conditions 1 and 2 enables the transmittance to be improved by not less than 20% as compared with the comparative example.

According to the present third exemplary embodiment, the width w3 of the N-slit electrode 15Bb adjacent to the S-slit electrode 15Ab arranged above the source wire 12L is made smaller than the width w4 of the E-slit electrodes 15C other than the S-slit electrode 15Ab and the N-slit electrode 15Bb, and the aperture width wS1 is made smaller than the aperture width wS2, whereby the light shielding film 31 can be arranged more inside than the edge of the S-slit electrode 15Ab. Consequently, even if the width w6 is set to 9 µm, the light shielding film 31 stops shielding the edge of the S-slit electrode 15Ab. As a result of this, the transmittance can be improved. In addition, improvement of the transmittance allows reducing power consumption of a back light with respect to required brightness specification.

Further, because the FFS mode is employed, a liquid crystal display device that can achieve a wide viewing angle, high brightness, a high display quality, and energy saving can be provided. It is to be noted that the TFT with the top gate type MOS structure has been explained as an example herein, but the structure of the TFT, the material for the semiconductor layer, the shape of the slit electrode, the shapes of the pixel electrode and the common electrode, etc. are just one examples, and the present invention is not limited to the above-described embodiments. In addition, the example of the transmission type liquid crystal display device has been explained, but the present invention may be applied to a transflective liquid crystal display device. Further, the example has been explained that the line-like patterns of the slit electrode 15 extend substantially in the same direction as the source wires, but alternatively, the patterns may extend substantially in a same direction as the gate wires. In this case, the extending direction of the light shielding film 31 is also defined as substantially the same direction as the gate wires.

In addition, the example of the color filter film 31 with a stripe array has been explained in the above-described embodiment, but a mosaic array may be employed in which the same colors as RGB are obliquely arranged. The example of the light shielding film 31 has been explained that extends substantially in the same direction as a longitudinal direction of the slit electrode, but it goes without saying that a light shielding film that extends in an other direction may be disposed. Further, the line-like patterns of the slit electrode 15 may extend substantially in the same direction as the source wire 12L when macroscopically viewed, and the slit-like apertures may be curved, zigzagged, etc.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device comprising:
    a first substrate;
    a second substrate arranged opposite to the first substrate;
    a liquid crystal layer sealed between the first substrate and the second substrate, wherein
    the first substrate comprises:
        a plurality of gate wires;
        a plurality of source wires that intersect the plurality of gate wires;
        a slit electrode that has a plurality of slit-like apertures so as to form a plurality of line-like patterns substantially in a same direction as either the source wires or the gate wires, with a main line-like pattern; and
        a plate-shaped electrode that has an overlap area with the slit electrode as viewed in plan view, through an insulating layer, the plate-shaped electrode being on a lower layer than the slit electrode,
    the second substrate comprises:
        a plurality of color filter films; and
        a light shielding film that partitions color filter films and extends substantially in a same direction as the line-like patterns of the slit electrode, and that has an overlap area with either the source wires or the gate wires as viewed in plan view, and that is arranged so that the plurality of color filter films are partitioned to prevent color mixture when displayed in a single color,
    either the plate-shaped electrode or the slit electrode is defined as a pixel electrode arranged so as to be connected to the plurality of source wires through a switching element, and the other electrode is defined as a common electrode, and a non-opposed area to the light shielding film is formed at each end of a main portion of the slit electrode in the width direction so that6 a transmittance may not be reduced due to the light shielding film in the areas where the light shielding film and the slit electrode are arranged in an overlapped manner, as viewed in plan view,
    wherein the light shielding film extends outward farther than one of the source wire and the gate wire, and the light shielding film has a width such that there is no color mixture in a view angle range between plus and minus 45 degrees when a single color is displayed,
    wherein the slit electrode and the plate-shaped electrode are composed of transparent electrodes,
    wherein the slit electrode comprises an S-slit electrode disposed above one of the source wire as viewed in plan view,
    wherein the plate-shaped electrode is disposed below the S-slit electrode layer and opposite to an end in the width direction of the S-slit electrode as viewed in plan view, and
    wherein in the area where the width-direction end of the S-slit electrode and the plate-shaped electrode are arranged to be opposed to each other, a part that is not opposed to the light shielding film is formed in the S-slit electrode so that the light shielding film is not opposed above an area in which a highest-transmittance part is formed.

2. The liquid crystal display device according to claim 1, wherein wires formed substantially in a same direction as the line-like patterns of the slit electrode are the source wires.

3. The liquid crystal display device according to claim 1, wherein the non-opposed areas of both ends of the central main line-like pattern of the slit electrode are substantially the same.

4. The liquid crystal display device according to claim 1, wherein as means for adjusting to form the non-opposed area of the light shielding film at the end of the slit electrode in the width direction, a width of the slit-like aperture that forms the slit electrode, where the light shielding film and the slit electrode are arranged in the overlapped manner as viewed from a plane, is made smaller than a width of the slit-like apertures formed in the other positions.

5. The liquid crystal display device according to claim 4, wherein wires formed substantially in a same direction as the line-like patterns of the slit electrode are the source wires.

6. The liquid crystal display device according to claim 4, wherein as means for adjusting to form the non-opposed area of the light shielding film at the end of the slit electrode in the width direction, a width of the line-like patterns of a slit electrode adjacent to the slit electrode, where the light shielding film and the slit electrode are arranged in the overlapped manner as viewed from a plane, is made smaller than a width of the line-like patterns of the slit electrodes arranged at the other positions.

7. The liquid crystal display device according to claim 6, wherein wires formed substantially in a same direction as the line-like patterns of the slit electrode are the source wires.

8. The liquid crystal display device according to claim 6, wherein the non-opposed areas of both ends of the slit electrode are substantially the same.

9. The liquid crystal display device according to claim 4, wherein the non-opposed areas of both ends of the slit electrode are substantially the same.

10. The liquid crystal display device according to claim 1, wherein as means for adjusting to form the non-opposed area of the light shielding film at the end of the slit electrode in the width direction, a width of the line-like patterns of a slit electrode adjacent to the slit electrode, where the light shielding film and the slit electrode are arranged in the overlapped manner as viewed from a plane, is made smaller than a width of the line-like patterns of the slit electrodes arranged at the other positions.

11. The liquid crystal display device according to claim 10, wherein wires formed substantially in a same direction as the line-like patterns of the slit electrode are the source wires.

12. The liquid crystal display device according to claim 10, wherein the non-opposed areas of both ends of the slit electrode are substantially the same.

13. The liquid crystal display device according to claim 1, wherein the non-opposed areas of both ends of the slit electrode are substantially the same.

* * * * *